United States Patent
Coyle et al.

(10) Patent No.: US 9,892,021 B2
(45) Date of Patent: Feb. 13, 2018

(54) INJECTION OF CODE MODIFICATIONS IN A TWO SESSION DEBUG SCRIPTING ENVIRONMENT

(71) Applicants: Jared Coyle, Phoenixville, PA (US); Holger Graf, Glen Mills, PA (US); Setu Jha, Bangalore (IN)

(72) Inventors: Jared Coyle, Phoenixville, PA (US); Holger Graf, Glen Mills, PA (US); Setu Jha, Bangalore (IN)

(73) Assignee: SAP SE, Walldorf (DE)

( * ) Notice: Subject to any disclaimer, the term of this patent is extended or adjusted under 35 U.S.C. 154(b) by 177 days.

(21) Appl. No.: 14/661,738

(22) Filed: Mar. 18, 2015

(65) Prior Publication Data
US 2016/0274998 A1 Sep. 22, 2016

(51) Int. Cl.
*G06F 11/36* (2006.01)
(52) U.S. Cl.
CPC ........ *G06F 11/3664* (2013.01); *G06F 11/362* (2013.01)
(58) Field of Classification Search
CPC ............. G06F 11/3636; G06F 11/3684; G06F 11/3414; G06F 11/3612; G06F 11/3006; G06F 11/362; G06F 11/3664; G06F 17/505; G06F 8/62; H04L 43/0817; G06Q 10/06; G06Q 10/10; G02B 6/105
See application file for complete search history.

(56) References Cited

U.S. PATENT DOCUMENTS

| | | | |
|---|---|---|---|
| 5,675,803 A | 10/1997 | Preisler et al. | |
| 6,249,886 B1 | 6/2001 | Kalkunte | |
| 6,708,326 B1 | 3/2004 | Bhattacarya | |
| 6,915,513 B2 | 7/2005 | Duesterwald et al. | |
| 7,225,433 B2 | 5/2007 | Jentsch et al. | |
| 8,065,640 B1 * | 11/2011 | Richter | G06F 17/505 716/104 |
| 8,171,452 B2 | 5/2012 | Crasovan et al. | |
| 8,266,597 B2 | 9/2012 | Panchamukhi et al. | |
| 8,321,856 B2 | 11/2012 | Auer et al. | |
| 8,572,160 B2 | 10/2013 | Mackey | |
| 8,806,037 B1 * | 8/2014 | Kalra | H04L 43/0817 709/223 |
| 8,850,420 B2 | 9/2014 | Yousouf et al. | |
| 8,856,774 B1 | 10/2014 | Kulaga et al. | |
| 8,893,106 B2 | 11/2014 | Ningombam et al. | |
| 2002/0100036 A1 * | 7/2002 | Moshir | G06F 8/62 717/173 |

(Continued)

*Primary Examiner* — Tuan Vu
(74) *Attorney, Agent, or Firm* — Brake Hughes Bellermann LLP

(57) ABSTRACT

In one general aspect, a method can include receiving at least one set of correction instructions, validating the at least one set of correction instructions for use by a debugger when debugging an application program, and generating a debug script. The debug script can include text for automatically implementing the validated at least one set of correction instructions in the debugger when debugging an application program. The method can further include generating a plurality of data structures for use by the debug script based on the validated at least one set of correction instructions, and outputting the debug script to the debugger for use by the debugger when debugging the application program.

15 Claims, 9 Drawing Sheets

(56) References Cited

U.S. PATENT DOCUMENTS

| | | | |
|---|---|---|---|
| 2004/0015600 A1* | 1/2004 | Tiwary | G06F 11/3414 709/234 |
| 2005/0193269 A1* | 9/2005 | Haswell | G06F 11/3684 714/38.13 |
| 2006/0059253 A1* | 3/2006 | Goodman | G06Q 10/10 709/223 |
| 2006/0173987 A1 | 8/2006 | Friesen et al. | |
| 2007/0083813 A1* | 4/2007 | Lui | G06F 11/3612 715/709 |
| 2007/0157174 A1 | 7/2007 | Gebhardt et al. | |
| 2009/0259748 A1* | 10/2009 | McClure | G02B 6/105 709/224 |
| 2010/0058114 A1* | 3/2010 | Perkins | G06Q 10/06 714/39 |
| 2010/0106819 A1* | 4/2010 | Demir | G06F 11/3006 709/224 |
| 2014/0033183 A1* | 1/2014 | Brown | G06F 11/3636 717/131 |
| 2014/0281732 A1 | 9/2014 | Elias et al. | |

\* cited by examiner

INJECTION OF CODE MODIFICATIONS IN A TWO SESSION DEBUG SCRIPTING ENVIRONMENT

TECHNICAL FIELD

This description generally relates to testing and implementing updates to a software program.

BACKGROUND

Enterprise customers can execute (run) many software programs and applications to automate business and manufacturing activities. In some cases, one or more of the programs may not function as desired or needed, exhibiting unwanted behavior or producing errors. In order to attempt to fix the problem, the customer may need to suspend normal operations to make changes or updates to the software programs and then test the updated software programs to determine if the changes have solved the problem. In some cases, if the change did not provide a solution to the problem, the customer needs to "roll back" to the previous software programs or code base the customer was previously using. Next, they may repeat the process of making changes or updates to the software programs, this time trying another solution to the problem.

This iterative process can be time consuming. It may also necessitate that a customer suspend normal operations in order to test and verify the updated software programs resulting in lost time and, in some cases, lost revenue.

SUMMARY

In one general aspect, a non-transitory, machine-readable medium has instructions stored thereon. The instructions, when executed by a processor, cause a computing device to receive at least one set of correction instructions, validate the at least one set of correction instructions for use by a debugger when debugging an application program, generate a debug script, the debug script including text for automatically implementing the validated at least one set of correction instructions in the debugger when debugging the application program, generate a plurality of data structures for use by the debug script based on the validated at least one set of correction instructions, and output the debug script to the debugger for use by the debugger when debugging the application program.

Implementations may include one or more of the following features. For example, the at least one set of correction instructions can be included in a note. The note can be identified using a note number. The note can be included in a plurality of note records included in a database. The instructions, when executed by the processor, can further cause the computing device to receive a filename, and store the debug script as a file, a name of the stored debug script file being the received filename. The set of correction instruction can include a plurality of correction instruction deltas. Each correction instruction delta can be indicative of a code change for implementing in the application program. The code change can be directed towards solving an identified issue associated with the application program. Each correction instruction delta can include at least one correction instruction sub-delta. The at least one correction instruction sub-delta can include a context block, an insert block, and a delete block. The insert block can include code for the at least one correction instruction sub-delta. The context block can include location information indicative of a location in the application program where the code included in the insert block is to be inserted when debugging the application program. The delete block can include information that identifies code included in the application program that is to be skipped.

In another general aspect, a computer system can include an enterprise computing system including an enterprise database including a plurality of notes and an enterprise server including a debug script generator, a customer computing system including a debugger, and a computing device configured to provide a selection of a particular note from the plurality of notes. The particular note can be associated with an application program. The selection of the particular note can be based on correction instructions included in the note. The debug script generator can be configured to generate a debug script based on the correction instructions included in the note, and provide the debug script to the debugger included in the customer computing system. The debugger can be configured to execute the application program in a first session of the debugger, and execute the debug script in a second session of the debugger.

Implementations may include one or more of the following features. For example, the correction instructions can address a problem with the application program. The debug script can use functions included in the debugger to debug the application program without changing code included in the application program. The debug script can execute a block of code included in an insert block based on the first session of the debugger reaching a scripted debugger breakpoint. When the first session reaches the scripted debugger breakpoint, the first session can provide at least one variable to the second session. The debug script can skip executing a block of code included in the application program based on the first session of the debugger reaching a scripted debugger breakpoint. The block of code to skip can be defined in a delete block.

In yet another general aspect, a method can include receiving at least one set of correction instructions, validating the at least one set of correction instructions for use by a debugger when debugging an application program, generating a debug script, the debug script including text for automatically implementing the validated at least one set of correction instructions in the debugger when debugging the application program, generating a plurality of data structures for use by the debug script based on the validated at least one set of correction instructions, and outputting the debug script to the debugger for use by the debugger when debugging the application program.

Implementations may include one or more of the following features. For example, the method can further include receiving a filename, and storing the debug script as a file, a name of the stored debug script file being the received filename.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
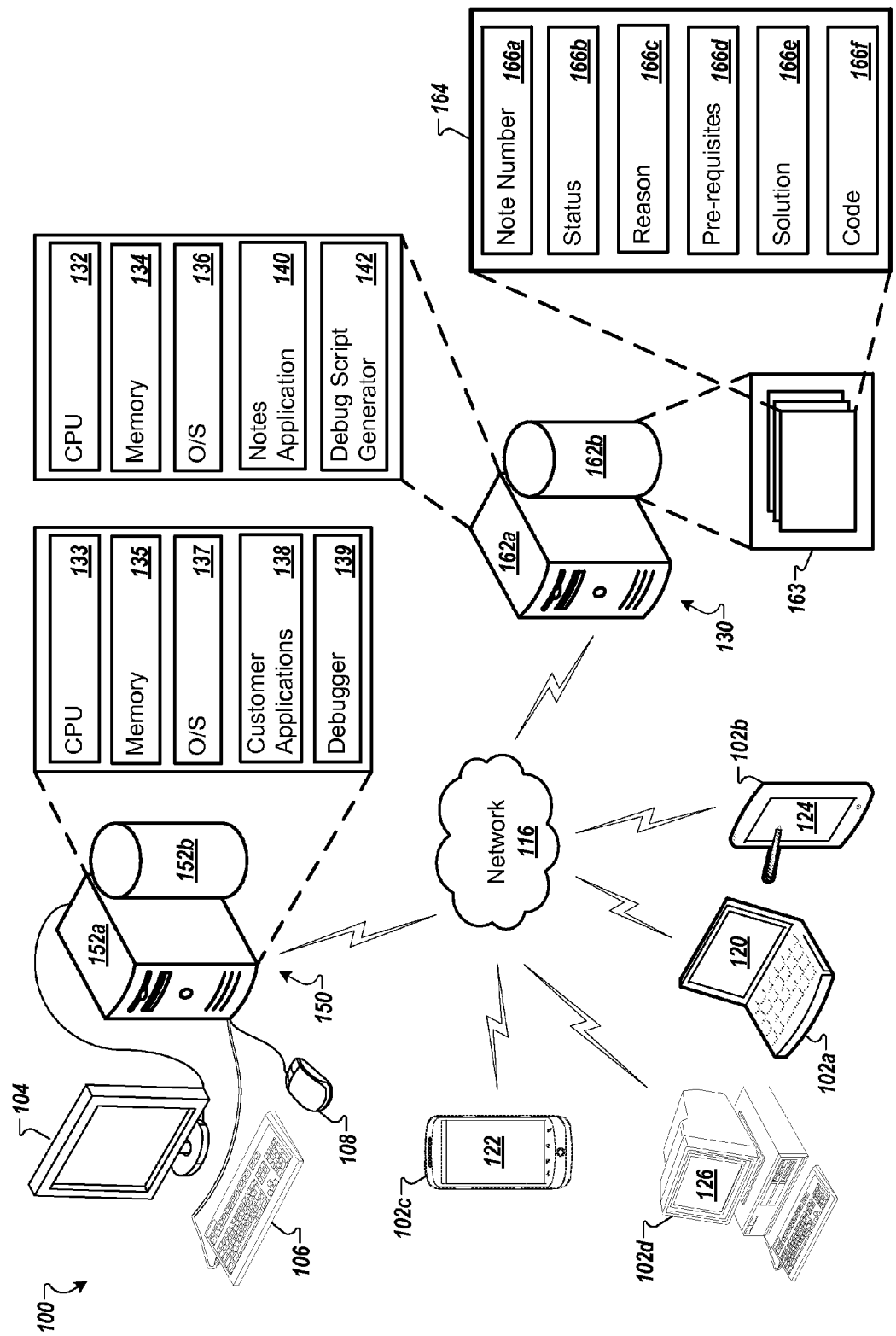
FIG. 1 is a diagram of an example system that can create and execute a debugger script.

In some implementations, an enterprise can provide customers with a large body of knowledge about enhancements and updates to software programs provided by the enterprise. An online service system (OSS) can include the body of knowledge in an online accessible system (e.g., accessible using the Internet). In addition, or in the alternative, the knowledge base can include information about and updates or corrections for known issues with the software programs provided by the enterprise. The enterprise can continually update the knowledge base based on information received and knowledge gained by the enterprise.

Enterprise customers can have access to this knowledge base. For example, a customer can search the knowledge base to determine updates to versions of software programs or components they are using. In another example, if a customer encounters a problem or error (e.g., non-standard behavior, unexpected behavior) when executing a particular software program, the customer can search the knowledge base for one or more possible solutions to the problem.

The solutions can be in the form of a note that applies to a version of a software component. A note can include correction instructions from the enterprise for a known issue or problem in the enterprise's software systems. A note can include details about a problem and details for a suggested solution to the problem. In some cases, a note can include code corrections that can be applied to particular versions of a software program in order to solve the identified issue or problem. In some cases, a note can include code corrections that can be applied to particular versions of a software program in order to update the software program.

A customer may find it difficult to know when, and if, implementation of the suggestions and corrections included in a note will achieve a desired outcome. In following best practices, the customer should maintain a copy (create a backup version) of the current version of the system software before altering it using the suggestions and possible code corrections provided by the note. When applying the change to the system software, the customer should document any code changes. If the change to the system software does not solve the problem, the customer should be able to revert the software system code change. The customer should also be prepared to test the updated version of the system software to make sure that the overall functionality of the system software is maintained. A customer should apply the changes included in a note one note at a time to ensure not only that the implementation of the changes and updates included in the note has solved the problem but also that the implementation of the changes and updates included in the note have not caused other problems with the system software.

Applying the changes included in a note, one note at a time can be a time consuming complicated process. The implementing of the changes and updates included in the note may not even address the problem or issue at hand. A customer may not want to implement the changes and updates to the system software included in the note unless there is a significant amount of certainty that the changes and updates included in the note will solve the problem or correct the issue.

In some situations, a customer may use a debugger to debug the system software. Debugger scripting can automate the debugging process by executing debugger steps, changing variable values, and obtaining variable values. A debugger script can use a debugger interface to automate debugger actions otherwise performed manually by a customer. A debugger script can perform traces, and analyze and modify contents of variables and objects in a software program. A debugger script can use functions included in the debugger to debug the system software by manipulating the applications included in the system software without changing the system software. In some cases, user input can trigger a debugger script for a single execution. In other cases, an event (e.g., reaching a breakpoint or watchpoint in the system software) can trigger a debugger script.

A customer can use debugger scripting to implement the changes and updates to the system software included in a note without changing the system software. A customer can easily implement the changes and updates to the system software included in a note to see if the changes and updates address the problem(s) and/or issue(s) identified for correction in the system software by the customer. If the changes and updates to the system software included in a note do not address/solve the problem(s) and/or issue(s) identified by the customer, the customer can easily implement the changes and updates to the system software included in another note to see if they address/solve the problem(s) and/or issue(s) identified by the customer. The customer does not need to make any changes to the system software they are currently running in order to determine if changes and updates to the system software included in a note address/solve the problem(s) and/or issue(s) identified by the customer. The customer can quickly and easily determine if a solution to problem(s) and/or issue(s) they are encountering in the software program can be solved.

A customer can implement debugger scripting using a two session debugger that separates the debugger session from the application session. The debugger can run (execute) in a first session while the software program or application for debugging is running (executing) in a second separate session. For example, the debugger can perform code insertions by executing code provided in a note at a breakpoint in the execution of the system software. The debugger can perform code deletions by skipping over (not executing) code starting at a breakpoint. The note can specify the code that the debugger should skip over (not execute) effectively "deleting" the code. The debugger can perform the code insertions and deletions (which are designated and described in a note) into code of a software program during the runtime or execution of the software program without changing the code within the software program.

FIG. 1 is a diagram of an example system 100 that can create and execute a debugger script. A two session debugger 139 can execute the debugger script on software programs (one or more applications 138) executing on a customer computing system 150.

The customer computing system 150 can include one or more computing devices (e.g., a customer server 152*a*) and one or more computer-readable storage devices (e.g., a customer database 152*b*). The server 152*a* can include one or more processors (e.g., server CPU 133), and one or more memory devices (e.g., server memory 135). Computing devices 102*a*-*d* can communicate with the customer computing system 150 (and the customer computing system 150 can communicate with the computing devices 102*a*-*d*) using a network 116. The server 152*a* can execute a server O/S 137, and one or more applications 138.

An enterprise computing system 130 can include one or more computing devices (e.g., an enterprise server 162*a*) and one or more computer-readable storage devices (e.g., an enterprise database 162*b*). The enterprise database 162*b* can include one or more notes 163 (note records). The server 162*a* can include one or more processors (e.g., server CPU 132), and one or more memory devices (e.g., server memory 134). Computing devices 102*a*-*d* can communicate with the enterprise computing system 130 (and the enterprise computing system 130 can communicate with the computing devices 102*a*-*d*) using the network 116. The server 162*a* can execute a server O/S 136, and a notes application 140.

In some implementations, the network 116 can be a public communications network (e.g., the Internet, cellular data network, dialup modems over a telephone network) or a private communications network (e.g., private LAN, leased lines). In some implementations, the computing devices 102*a*-*d* can communicate with the network 116 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

A customer or an enterprise representative can connect to or otherwise interface with the customer computing system 150 by way of the network 116 using the computing devices 102*a*-*d*. In addition or in the alternative, a customer or an enterprise representative can connect to or otherwise interface with the enterprise computing system 130 by way of the network 116 using the computing devices 102*a*-*d*. For example, computing device 102*a* can be a mobile phone, a smartphone, a personal digital assistant, or other type of mobile computing device. The computing device 102*a* includes a display device 120. For example, computing device 102*b* can be a laptop or notebook computer. The computing device 102*b* includes a display device 124. For example, computing device 102*c* can be a tablet computer. The computing device 102*c* includes a display device 122. For example, the computing device 102*d* can be a desktop computer. The computing device 102*d* can include a display device 126. A user of the computing devices 102*a*-*d* can use/interface with the display devices 120, 124, 122, and 126, respectively, when interacting with the customer computing system 150 and/or the enterprise computing system 130.

A monitor 104 (display device), a keyboard 106 and a mouse 108 can be connected to the customer computing system 150. In some implementations, the keyboard 106 and the mouse 108 can be connected to the customer computing system 150 using a wired connection and communications protocol, as shown in FIG. 1 and described herein. In some implementations, either or both of the keyboard 106 and the mouse 108 can be connected to the customer computing system 150 using a wireless connection and communications protocol as described herein.

A customer or enterprise representative can use the monitor 104, keyboard 106 and mouse 108 to provide input to and receive output from the customer computing system 150. The customer computing system 150 can communicate/interface with the enterprise computing system 130 using the network 116.

A note 164 included in the notes 163 can include note entries 166*a-f* (note fields). The note entries 166*a-f* can include, but are not limited, a note number entry 166*a*, one or more status entries 166*b*, a reason entry 166*c*, one or more pre-requisite entries 166*d*, a solution entry 166*e*, and a code entry 166*f*. For example, a customer or enterprise representative (a user) can connect to and interface with the enterprise computing system using one or more of the computing devices 102*a*-*d* (e.g., the computing device 102*a*). The user can execute a notes application 140 from the computing device 102*a*. The notes application 140 can access the enterprise database 162*b* and search the notes 163 for a solution for a problem or issue with the customer applications 138 (software programs) executing on the customer computing system 150. The user can search the notes 163 (e.g., search the entries for each of the notes 163) to find one or more notes that may provide a solution to the problem or issue. For example, the user may be provided a list of notes on the display device 120 that may provide a solution to the problem or issue. In some cases, the order of the listing of the notes can be based on statistical or other information about the predicted success of the solution. In some cases, the notes may be listed in order of ascending note number.

The user can select a note (e.g., the note 164) that the notes application 140 can provide to a debug script generator. For example, the user can identify the note 164 using the note number entry 166*a*. The debug script generator 142 can generate a debug script (a debug script file) for use by a debugger 139 included in the customer computing system 150 based on the information included in the note (e.g., based on one or more of the note entries 166*a-f*). The enterprise computing system 130 can provide the debug script to the customer computing system 150 using the network 116. The customer computing system 150 can store the debug script in the server memory 135. A debugger 139 included in the customer computing system 150 can run (execute) the debug script in a session on the customer computing system 150 while the customer applications 138 are executing in another session on the customer computing system 150.

In some implementations, the customer computing system 150 can include a debug script generator 142. In these implementations, the user can identify a note (e.g., the note 164) that the notes application 140 can provide to the customer computing system 150 and, specifically, to the debug script generator included in the customer computing system 150. The debugger 139 included in the customer computing system 150 can run (execute) the debug script in a session on the customer computing system 150 while the customer applications 138 are executing in another session on the customer computing system 150. In some implementations, one or more of the computing devices 102*a*-*d* (e.g., the computing device 102*a*) can include the debug script generator. In these implementations, the user can identify a note (e.g., the note 164) that the notes application 140 can provide to the computing device 102*a* and, specifically, to the debug script generator included in the computing device 102*a*. The computing device 102*a* can generate the debug script and provide it to the customer computing system 150 using the network 116. The customer computing system 150 can store the debug script in the server memory 135. The debugger 139 included in the customer computing system 150 can run (execute) the debug script in a session on the customer computing system 150 while the customer applications 138 are executing in another session on the customer computing system 150.

In some implementations, the user may interact with the debug script generator 142 to create a debug script. For example, the debug script generator 142 can provide a user interface for display on a display device 120 included in the computing device 102a. In some implementations, the user can use information included and maintained in a code management system to determine code differences between a code base installed at the customer site and the latest code updates.

Figure 2:
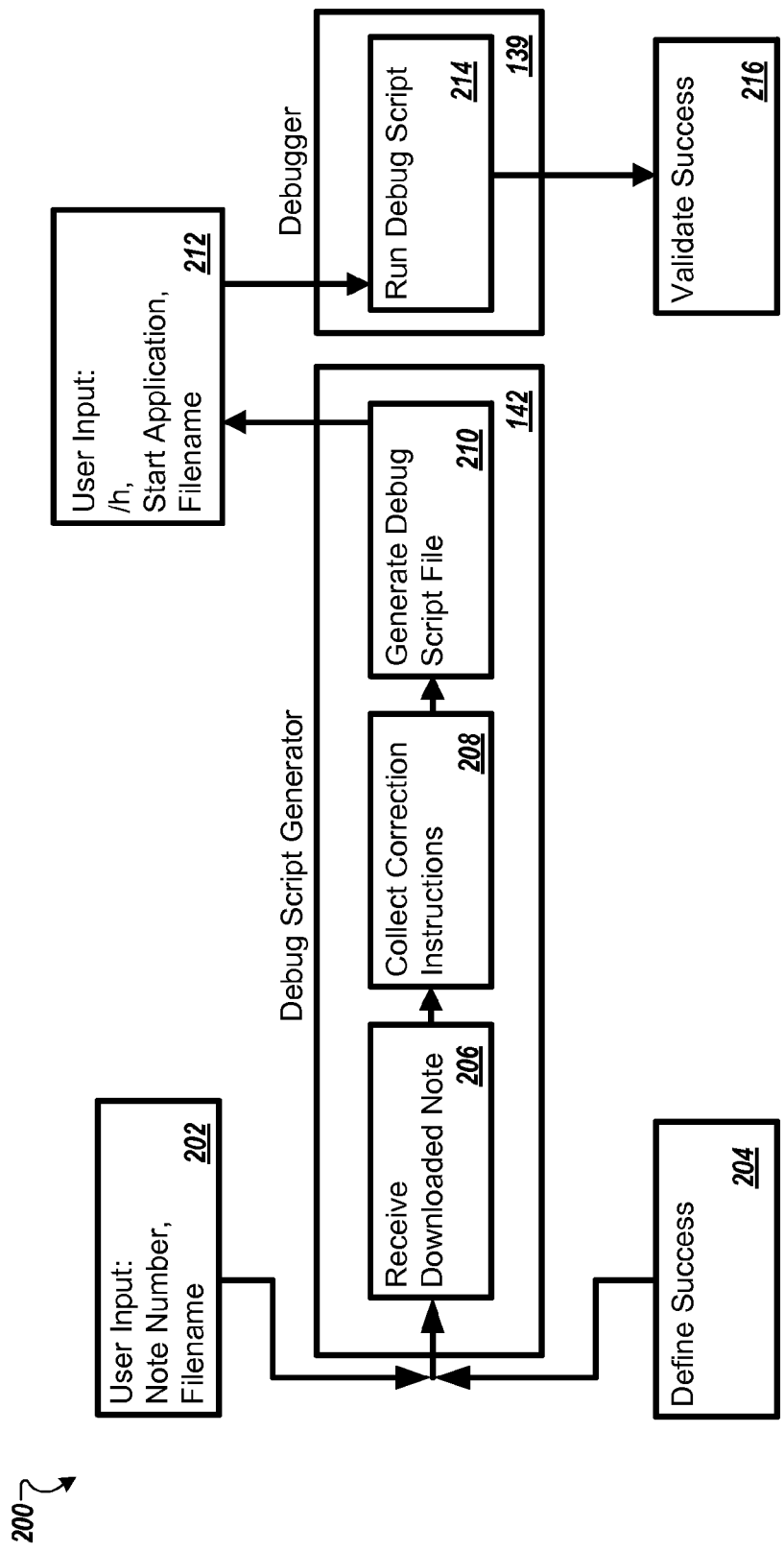
FIG. 2 is a block diagram of an example process for use of a note for debugging purposes by a debugger included in a customer computing system.

FIG. 2 is a block diagram of an example process 200 for the use of a note for debugging purposes by a debugger included in a customer computing system. For example, the system 100 as described with reference to FIG. 1 can execute or run the process 200 to generate and run a debug script.

A customer or enterprise representative (a user) can provide a note number and a filename as input to the debug script generator 142 (block 202). For example, referring to FIG. 1, the user can interface with/communicate with the enterprise computing system 130 using the computing device 102a.

Figure 3:
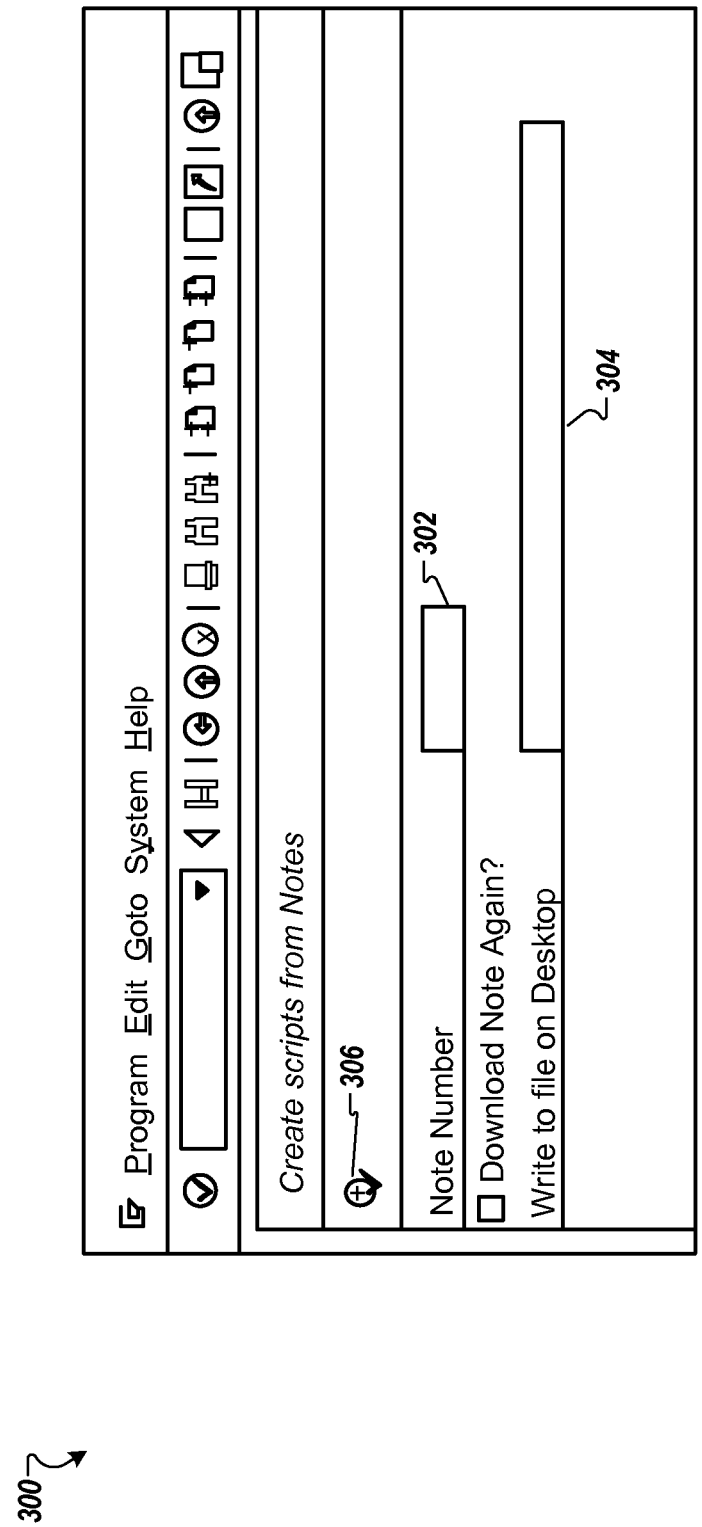
FIG. 3 shows an example user interface for a debug script generator.

FIG. 3 shows an example user interface 300 for a debug script generator. For example, the debug script generator 142 can provide the user interface 300 to a user of a computing device. For example, the debug script generator 142 can provide the user interface 300 to a customer or enterprise representative (a user) of the computing device 102a for display on the display device 120. The user can interact with the debug script generator 142 using the user interface 300. The user can enter a note number in a note number field 302. As described herein, a user can select the note (identified by a note number) for use by the debug script generator 142. The user can enter a filename for the generated script in a script filename field 304. For example, the generated script can be provided to the customer computing system 150 and stored in a file in the server memory 135 included in the customer computing system 150. In another example, the generated script can be provided to the customer computing system 150 and stored in a file in the customer database 152b included in the customer computing system 150.

Referring to FIG. 2, the user can define criteria for success (block 204). For example, a customer may have recently upgraded a business data application that interprets, analyzes, and prepares reports about business data. Since the upgrade, a reporting value associated with executives is incorrect. Referring to FIG. 1, the user, using the notes application 140, can search the notes 163 and identify a note (e.g., the note 164) that addresses the problem. The user can define success as achieving a more accurate (a correct) reporting value associated with the executives.

The identified note is provided (downloaded) to the debug script generator 142 (block 206). For example, referring to FIG. 1, the debug script generator 142 included in the enterprise server 162a can receive the note 164 from the enterprise database 162b. The enterprise database 162b can download the note 164 to the enterprise server 162a. The debug script generator 142 can collect correction instructions from the note (block 208). The debug script generator uses the collected correction instructions to generate a debug script file (block 210). Referring to FIG. 3, a user interacting with the user interface 300 for a debug script generator (e.g., the debug script generator 142) can select a generate script button 306 that triggers the generating of the debug script file. For example, referring to FIG. 1, the debug script generator 142 can generate the debug script file.

The enterprise computing system 130 can provide (send) the debug script file to the customer computing system 150. The debug script file can be stored in the server memory 135. For example, the debug script file can be an Extensible Markup Language (XML) file. The user can activate the debugger 139, run (execute) an application (one of the customer applications 138) that can perform a reproducible example of the problem being addressed by the debug script, and load the debug script file for execution by the debugger 139 (block 212). As described, the debugger 139 included in the customer computing system 150 can run (execute) the debug script in a session on the customer computing system 150 while the application can run (execute) in another session on the customer computing system 150.

In some implementations, a user can add or insert additional code into core application program code provided by the enterprise to the user, customizing the application program. In these implementations, the core application program is debugged and any code inserted by the customer (or any third party) into the core application program is bypassed. This allows validation of the core application program.

Figure 4A:
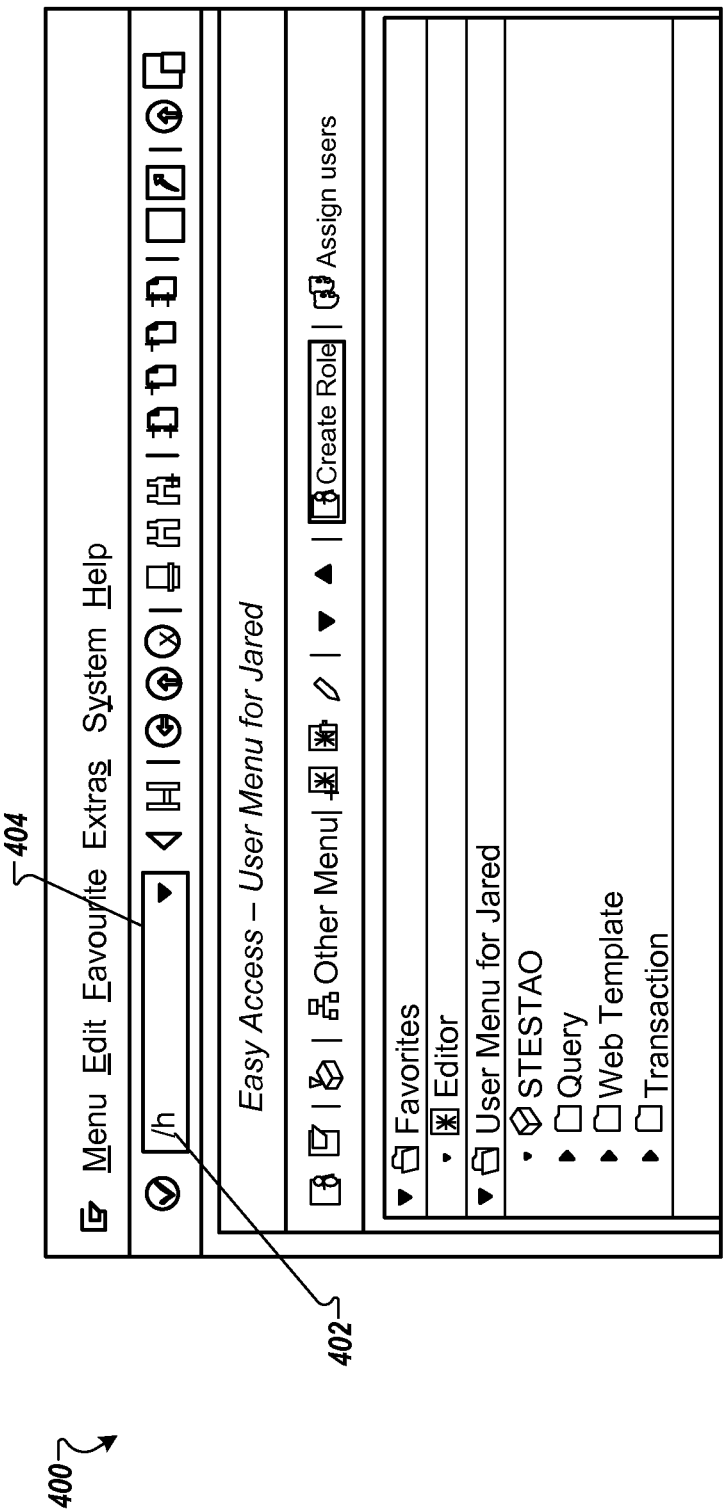
FIG. 4A shows an example user interface that includes a field for selecting or entering text that can activate a debugger.

FIG. 4A shows an example user interface 400 that includes a field 404 for selecting or entering text 402 (e.g., "/h") that can activate a debugger. For example, a first application (one of the customer applications 138) included in the customer computing system can provide the user interface 400 to a user of a computing device. For example, the first application can provide the user interface 400 to a customer or enterprise representative (a user) of the computing device 102a for display on the display device 120. The user can enter one or more characters into the field 402 that can activate the debugger 139.

Figure 4B:
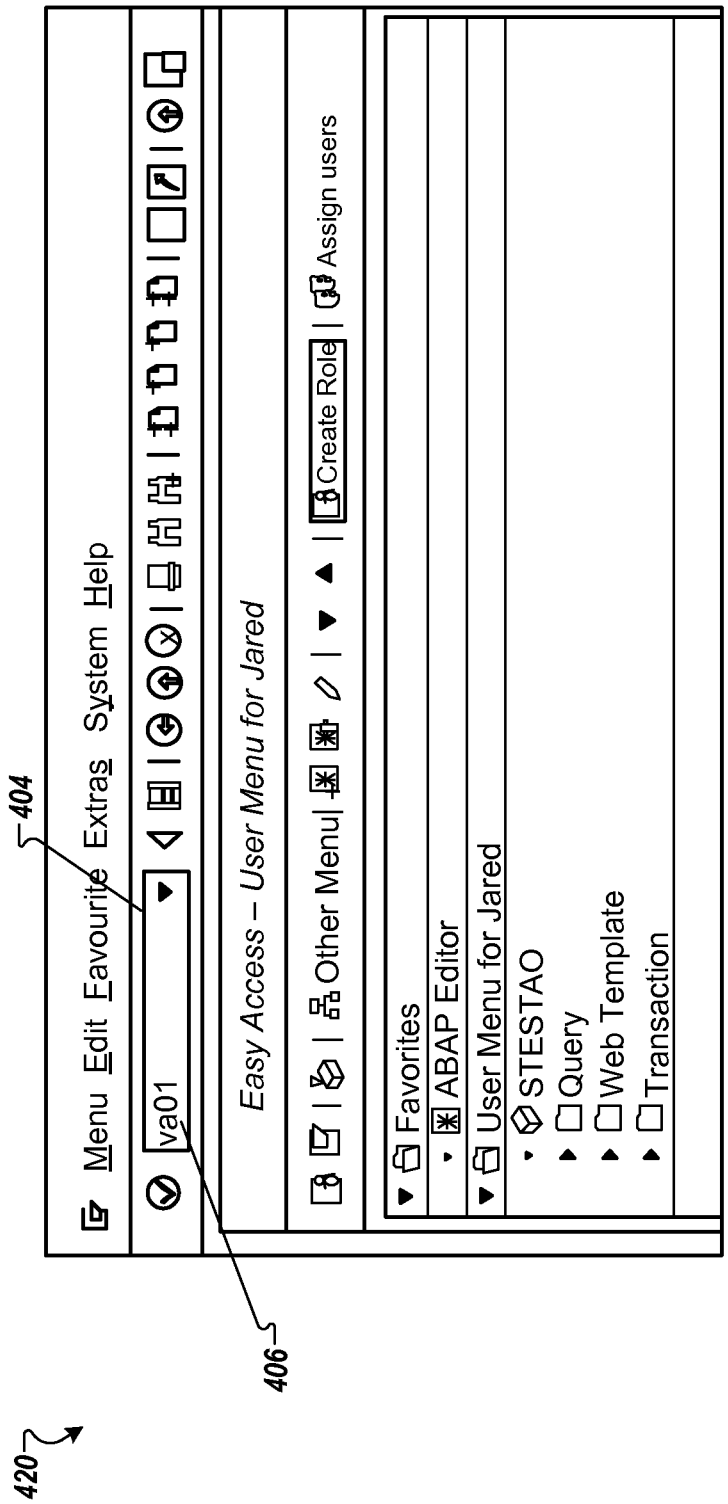
FIG. 4B shows an example user interface where the user can enter or select text in a field to run a second application that can perform a reproducible example of the problem being addressed by a debug script.

FIG. 4B shows the example user interface 400 where the user can enter or select text 406 (e.g., "va01") in the field 404 to run a second application (one of the customer applications 138) (e.g., the upgraded business application) that can perform a reproducible example of the problem being addressed by the debug script. For example, referring to the recently upgraded business data application, the entry in the field 404 can designate the upgraded business application that generated the erroneous reporting value associated with executives. The application is activated in a debug mode.

Figure 5:
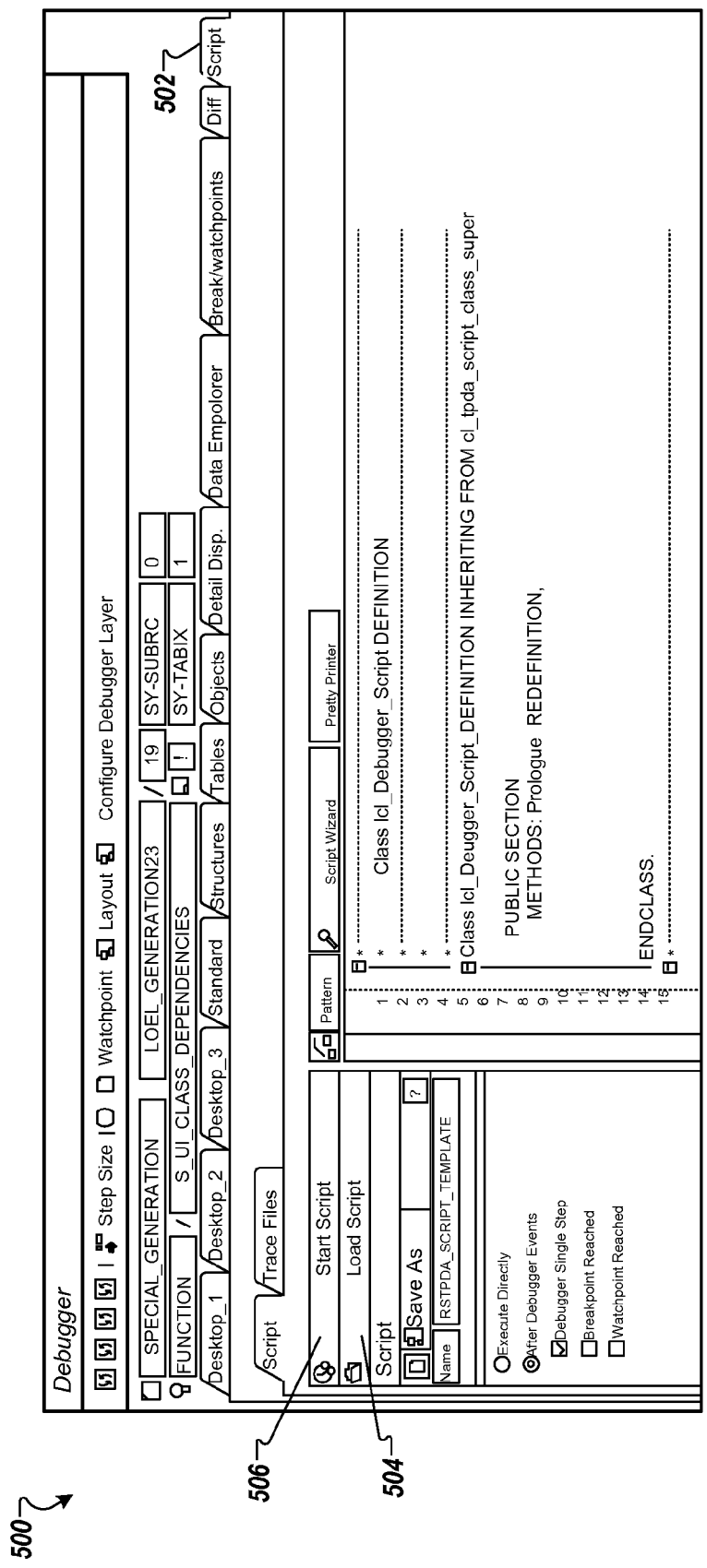
FIG. 5 shows an example user interface for a debugger.

FIG. 5 shows an example user interface 500 for a debugger. For example, referring to FIG. 1 and FIG. 2, the debugger 139 can provide the user interface 500 to a user of a computing device. For example, the debugger 139 can provide the user interface 500 to a customer or enterprise representative (a user) of the computing device 102a for display on the display device 120. The user can interact with the debugger 139 using the user interface 500. The user can select a script tab 502 in the user interface 500 that can provide the controls, input, and outputs for executing a debug script. The user can select the debug script for executing by browsing for and selecting the debug script by the debug script filename using the entry 504. Once the debug script is loaded, the user can select an execute debug script button 506 that starts the execution of the debug script.

Referring to FIG. 2, the debugger 139 can run (execute) the debug script (block 214). The debug script can automate debugger processes and modify control flow of the program being debugged (the second application (e.g., the upgraded business application) so that the program output matches the program output incorporating the implementation of the changes and updates included in the note.

The user can validate the success criteria (block 216). If implementing in the second application the changes and updates included in the note produces a desired outcome, the user can proceed to incorporate the changes described by the note into the customer application(s).

Figure 6:
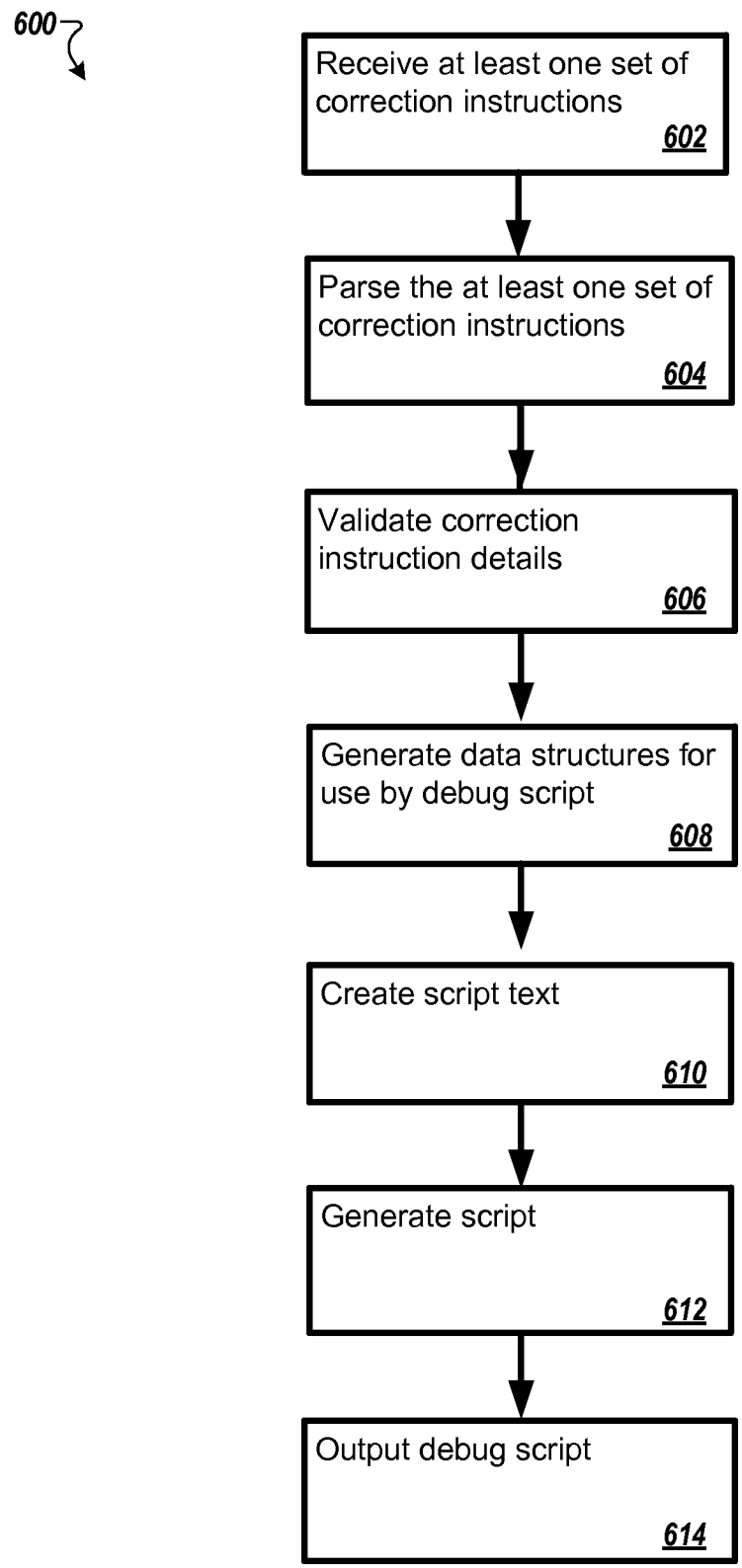
FIG. 6 is a flowchart that illustrates a method for generating a debug script.

FIG. 6 is a flowchart that illustrates a method 600 for generating a debug script. For example, the debug script generator 142 shown in FIG. 1 and FIG. 2 can perform the method 600. The debug script generator can have an example user interface 300 as shown in FIG. 3.

At least one set of correction instructions is received (block 602). For example, as described with reference FIGS. 1, 2, and 3, a customer or enterprise representative (a user) can interact with a user interface (e.g., the user interface 300) for a debug script generator (e.g., the debug script generator 142). For example, the user can enter a note number in the note number field 302 and a filename for the completed debug script in the script filename field 304. In some implementations, the debug script generator can receive a note number and filename. The debug script generator can be configured to access the notes 163 included in the enterprise database 162b. The debug script generator can be configured to retrieve (download) the specified note (the note of the note number) from the notes 163 included in the enterprise database 162b. The at least one set of correction instructions is parsed (block 604).

Figure 7:
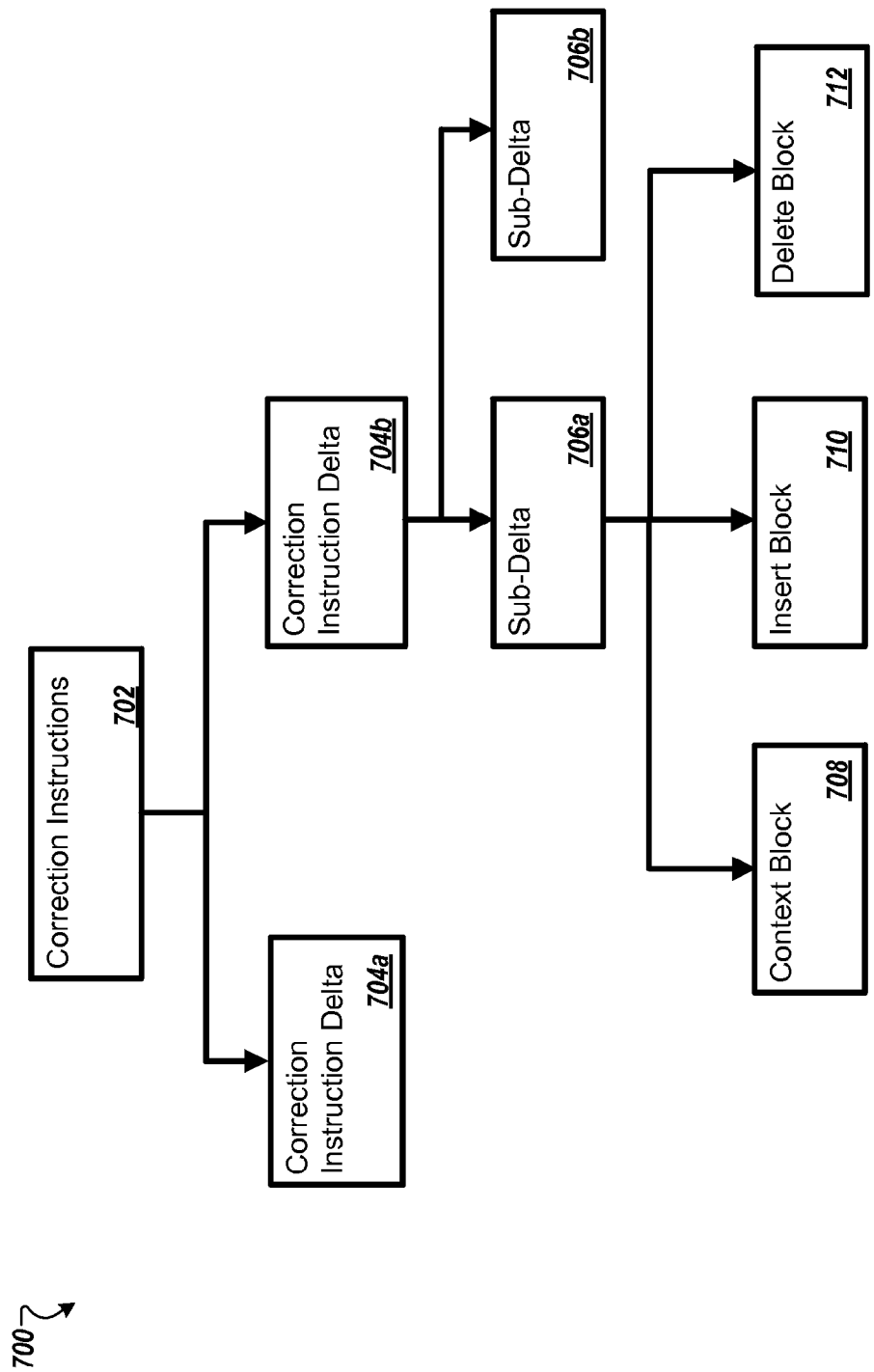
FIG. 7 is a block diagram of a data structure for a note.

FIG. 7 is a block diagram of a data structure 700 for a note. For example, a note can include a plurality of sets of correction instructions (e.g., correction instructions 702). Each set of correction instructions (e.g., the correction instructions 702) can include a plurality of correction instruction deltas (e.g., correction instruction deltas 704a-b). A correction instruction delta can indicate a change in code included in an application. The change can be directed towards solving a problem or issue with the application. Each correction instruction delta (e.g., the correction instruction delta 704a) can include at least one correction instruction sub-delta (e.g., correction instruction sub-deltas 706a-b). A correction instruction sub-delta can include further refined changes in the code directed towards solving the problem or issue. Each correction instruction sub-delta (e.g., the correction instruction sub-delta 706a) can include a context block 708, an insert block 710, and a delete block 712. The context block 708, the insert block 710, and the delete block 712 include information needed to create a debug script.

The context block 708 includes information as to where the code included in the insert block 710 is to be inserted in an application (software program) when debugging the application. The context block 708 can include location information (a line number) indicative of a location in the application where the code included in the insert block 710 is to be inserted in the application (software program) when debugging the application. A debug script generator (e.g., the debug script generator 139 as shown in FIG. 1 and FIG. 2) can use the information included in the context block 708 to determine scripted debugger breakpoints.

The insert block 710 includes all of the actual code for the associated correction instruction sub-delta (e.g., the correction instruction sub-delta 706a) that is to be inserted in the application during the debugging process. The code included in the insert block 710 can be modified for execution by the debugger (e.g., the debugger 139) when executing the debug script.

The delete block 712 includes information that identifies code included in an application that is to be deleted. In order to simulate the deleting of the code by the debugger, the debug script generator can create statements to insert into the application (e.g., GoTo statements) that bypass the code identified for deletion in the application. While debugging the application, the code identified for deletion is skipped (not executed). The delete block 712 can include information as to where a scripted breakpoint is to be set in an application (software program) when debugging the application. The scripted breakpoint can indicate the beginning or start of the deleted code. The delete block 712 can include information for a line number in the application where the statement (e.g., the GoTo statement) is to be inserted into the application.

The debug script generator (e.g., the debug script generator 142) can parse each correction instruction sub-delta (e.g., the correction instruction sub-deltas 706a-b). Each correction instruction sub-delta (e.g., the correction instruction sub-deltas 706a-b) includes a content block, and insert block, and a delete block. The debug script generator (e.g., the debug script generator 142) handles each context block separately.

Referring to FIG. 6, the debug script generator (e.g., the debug script generator 142) can validate each correction instruction sub-delta (e.g., the correction instruction sub-deltas 706a-b) for use in the currently installed version of the application program (the version of the application being debugged) (block 606).

The data structures for use by the debug script are generated (block 608). The debug script generator (e.g., the debug script generator 142) populates the data structures needed to generate the debug script code. The data structures can include, but are not limited to, a breakpoint list, sub-delta keying logic, mappings for modified insertion code variables, and a line number that will handle a deletion block (e.g., the line number for a GoTo statement).

The debug script generator (e.g., the debug script generator 142) creates the text for the script (block 610). The debug script generator (e.g., the debug script generator 142) can create the text for the script on a line-by-line basis. The debug script generator (e.g., the debug script generator 142) writes the text to the debug script file of the provided filename in order to generate the script file (block 612). The debug script generator (e.g., the debug script generator 142) outputs the debug script file to the debugger (e.g., the debugger 139) (block 614). The debug script generator (e.g., the debug script generator 142) outputs the debug script file to the debugger using the systems, processes, and methods described herein. In some implementations, the debug script file can be an XML-style scripting file.

Figure 8:
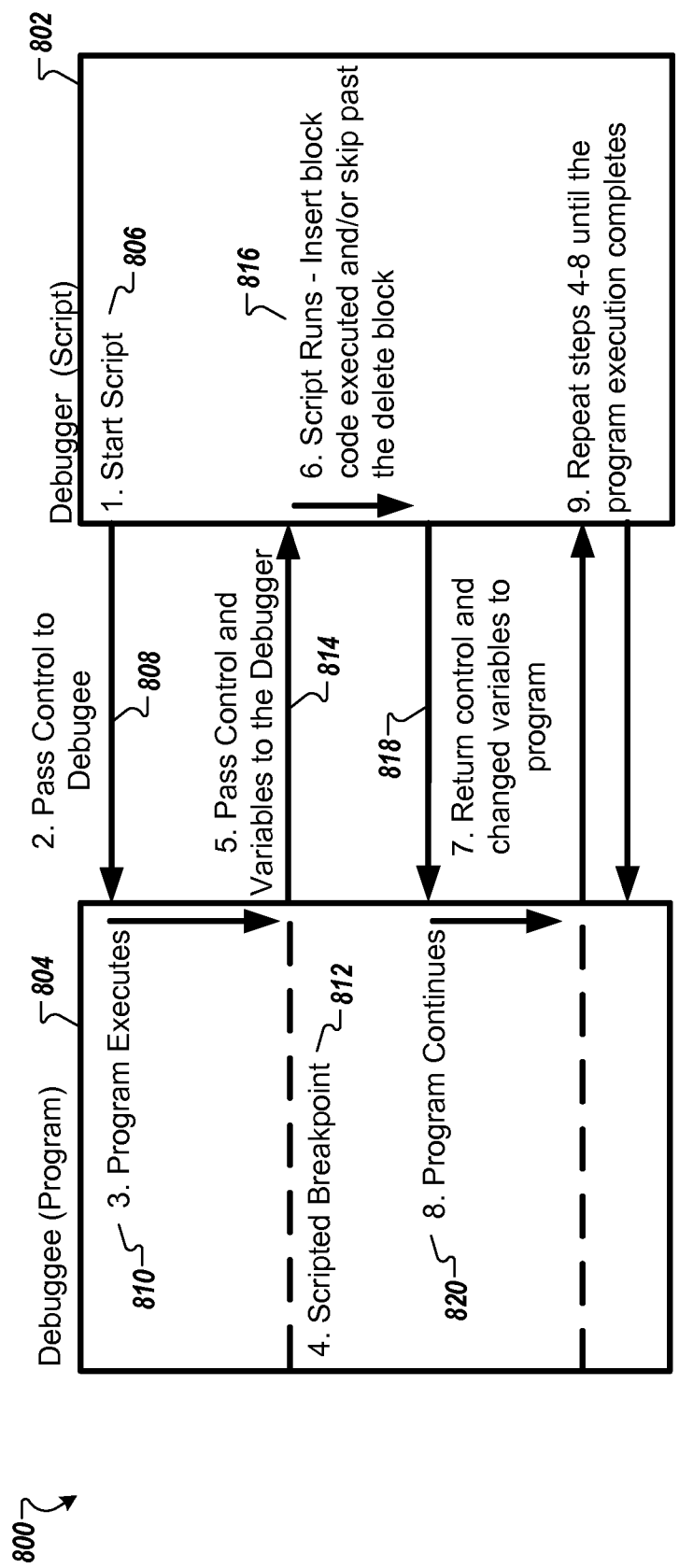
FIG. 8 is a block diagram that illustrates a debug script execution process.

FIG. 8 is a block diagram that illustrates a debug script execution process 800. The two-session debug process includes a program process 804 (debuggee) and a script process 802 (debugger). The program process 804 can be a process running (executing) an application for debugging. The program process 804 can be running (executing) in a debugger (e.g., the debugger 139 as shown in FIG. 1 and FIG. 2). The script process 802 can be a process running (executing) a debug script in the debugger (e.g., the debugger 139).

The debug script execution process begins (step 806) by loading the debug script and triggering the execution of the debug script in the debugger. For example, referring to FIG. 5, the debugger 139 can provide the user interface 500 to a customer or enterprise representative (a user) of the computing device 102a for display on the display device 120.

The user can select the script tab 502 in the user interface 500 that can provide the controls, input, and outputs for loading the debug script and triggering the execution of the debug script in the debugger. The user can select the debug script for executing by browsing for and selecting the debug script by the debug script filename using the entry 504. Once the debug script is loaded, the user can select an execute debug script button 506 that starts the execution of the debug script.

Once the debug script begins executing, it passes control back to the program process 804 (arrow 808). The program (application) continues to execute (run) (step 810) until a scripted debugger breakpoint is reached (step 812). Referring to FIG. 7, each scripted debugger breakpoint is associated with a particular sub-delta (e.g., the correction instruction sub-delta 706a) that includes a context block (e.g., the context block 708), an insert block (e.g., the insert block 710), and a delete block (e.g., the delete block 712). This allows the debug script to use debugger features to know which sub-delta to implement at any particular point in the execution of the program.

When the scripted debugger breakpoint is reached (step 812), control is passed from the program process 804 to the script process 802 (arrow 814). In addition, the program process 804 provides (sends) global, local and system variables from the program (application) executing in the program process 804 to the debug script executing in the script process 802.

The script process 802 runs (executes) the debug script (step 816). The debug script can determine a correction instruction sub-delta (e.g., the correction instruction sub-delta 706a) at which the program process 804 has stopped running (executing). The script process 802 executes the code included in an insert block associated with the correction instruction sub-delta (e.g., the insert block 710). In addition or in the alternative, script process 802 skips the code in the program process 804 specified by a delete block associated with the correction instruction sub-delta (e.g., the delete block 712).

The script process 802 returns control to the program process (arrow 818). The script process 802 provides (sends) new and updated values of program variables to the program process 804. The program variables were changed during the execution (running) of the code included in the insert block (e.g., the insert block 710)

The program process 804 continues to execute (run) until another scripted debug breakpoint is reached. The debug script execution process 800 continues, automatically repeating steps 812, 816, and 820. The steps 812, 816, and 820 are repeated as many times as needed until the execution of the program process 804 is complete.

During the debug script execution process 800, code included in the application being debugged is not modified or changed. The debug script can dynamically implement the information included in a note (e.g., changes to the code) associated with the debug script. The debug script can perform the processing of insert blocks and can perform the skipping of delete blocks, passing values for changed variables back to the application. By the end of the execution of the application, the debug script has implemented all of the code changes included in the note.

In some implementations, a customer or enterprise representative (a user) can create a debug script for debugging an application program. The user can debug the application program using a debug script execution process similar to the debug script execution process 800 described with reference to FIG. 8. A two-session debug process can include a program process (debuggee) and a script process (debugger) similar to the program process 804 and the script process 802 as described with reference to FIG. 8.

The debug script may execute (run) code included in the debug script in the debugger in addition to or in place of executing parts of the code included in the particular application program. As described herein, the debug script may insert code into the particular application program, and/or delete code from the particular application program (skip over/not execute certain code included in the particular application program). For example, the user can execute (run) the debug script in a debugger using a script process. The debugger may further provide a development environment to the user that can facilitate the creation and execution of the debug script. A program process can execute (run) the application program being debugged. As described with reference to FIG. 8, the user can implement a debug script execution process.

In some implementations, a customer or enterprise representative (a user) can leverage information included and maintained in a code management system to determine code differences between a code base installed at the customer site and the latest code updates. The developer can then determine how to implement incremental code changes to the installed base to see which one or more of the code changes may correct a problem or issue with the installed code base. For example, the user can create a debug script for debugging an application program included in the installed code base. The debug script may execute (run) code included in the debug script in a debugger in addition to or in place of executing parts of the code included in the particular application. The user can perform the debugging of the application program included in the installed code base using a debug script execution process similar to the debug script execution process 800 described with reference to FIG. 8. A two-session debug process can include a program process (debuggee) and a script process (debugger) similar to the program process 804 and the script process 802 as described with reference to FIG. 8.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A non-transitory, machine-readable medium having instructions stored thereon, the instructions, when executed by a processor, cause a first computing device to:
   receive, by the first computing device, a request to retrieve a note from a plurality of note records included in a database;
   retrieve, by the first computing device, the note from the database, the note including at least one set of correction instructions for an application program, the at least one set of correction instructions including at least one correction instruction delta indicating a change in code for the application program, the correction instruction delta including an insert block including code to be inserted into the application program by a debugger included in a second computing device during debugging of the application program, and a context block identifying a location within the application program for inserting the code included in the insert block during the debugging of the application program;
   generate, by the first computing device, a debug script using the note, the generating including parsing the at least one correction instruction delta, the debug script including instructions for automatically controlling the insertion of the code included in the insert block into the application program at the location identified in the context block during the debugging of the application program when the execution of the application program reaches the location identified in the context block; and
   output, by the first computing device, the debug script to the debugger included in the second computing device for use by the debugger when debugging the application program.

2. The medium of claim 1, wherein the note is identified using a note number.

3. The medium of claim 1, wherein the instructions, when executed by the processor, further cause the first computing device to:
   receive a filename; and
   store the debug script as a file, a name of the stored debug script file being the received filename.

4. The medium of claim 1,
   wherein the at least one correction instruction delta further includes a delete block that identifies code included in the application program that is to be skipped.

5. The medium of claim 1,
   wherein the first computing device is an enterprise server and the second computing device is a customer server, and
   wherein the first computing device and the second computing device communicate by way of a network.

6. The medium of claim 1, wherein the location is identified by a scripted debugger breakpoint.

7. The medium of claim 1, wherein the correction instruction delta further includes a delete block identifying code to skip.

8. The medium of claim 7, wherein the location identified in the context block further identifies a location within the application program for a start of code to skip during the debugging of the application, the code to skip being identified by the delete block.

9. A system comprising:
memory; and
at least one processor coupled to the memory, the at least one processor being configured to implement an enterprise computing system, a customer computing system, and a computing device,
the enterprise computing system including an enterprise database including a plurality of notes and an enterprise server including a debug script generator,
the customer computing system including a debugger, and
the computing device being configured to provide a selection of a particular note from the plurality of notes, the particular note being associated with an application program and the selection of the particular note being based on correction instructions included in the note, the correction instructions including an insert block including code to be inserted into the application program by the debugger during debugging of the application program, and a context block identifying a location within the application program for inserting the code included in the insert block during the debugging of the application,
the debug script generator being configured to:
   generate a debug script based on the correction instructions included in the note, the debug script including instructions for automatically controlling the insertion of the code included in the insert block into the application program at the location identified in the context block during the debugging of the application program when the execution of the application program reaches the location identified in the context block, and
   provide the debug script to the debugger included in the customer computing system, and
the debugger being configured to:
   execute the application program in a first session of the debugger, and
   execute the debug script in a second session of the debugger.

10. The system of claim 9, wherein the debug script uses functions included in the debugger to debug the application program without changing code included in the application program.

11. The system of claim 9, wherein executing the debug script in the second session of the debugger includes executing the code included in the insert block based on the application program executing in the first session of the debugger reaching the location identified in the context block.

12. The system of claim 11, wherein when the application program executing in the first session of the debugger reaches the-location identified in the context block, the first session provides at least one variable to the second session.

13. The system of claim 9, wherein the correction instructions further include a delete block identifying code to skip.

14. The system of claim 13, wherein the context block further identifies an additional location within the application program for a start of code to skip during the debugging of the application, the code to skip being defined by the delete block.

15. The system of claim 9, wherein the identified location within the application program for inserting the code is a scripted debugger breakpoint.

* * * * *